United States Patent
Zhu et al.

(10) Patent No.: US 9,323,685 B2
(45) Date of Patent: Apr. 26, 2016

(54) DATA STORAGE SPACE PROCESSING METHOD AND PROCESSING SYSTEM, AND DATA STORAGE SERVER

(71) Applicant: Tencent Technology (Shezhen) Company Limited, Guangdong (CN)

(72) Inventors: Jianping Zhu, Guangdong (CN); Yaqing Li, Guangdong (CN); Jianfeng Xu, Guangdong (CN); Chencheng Li, Guangdong (CN); Feiling Fu, Guangdong (CN); Liusong Zhu, Guangdong (CN)

(73) Assignee: Tencent Technology (Shenzhen) Company Limited, Futian District Shenzhen, Guangdong (CN)

( * ) Notice: Subject to any disclaimer, the term of this patent is extended or adjusted under 35 U.S.C. 154(b) by 0 days.

(21) Appl. No.: 14/413,049

(22) PCT Filed: Jul. 26, 2013

(86) PCT No.: PCT/CN2013/080180
§ 371 (c)(1),
(2) Date: Jan. 6, 2015

(87) PCT Pub. No.: WO2014/015828
PCT Pub. Date: Jan. 30, 2014

(65) Prior Publication Data
US 2015/0193350 A1    Jul. 9, 2015

(30) Foreign Application Priority Data
Jul. 27, 2012   (CN) .......................... 2012 1 0264003

(51) Int. Cl.
*G06F 12/00*    (2006.01)
*G06F 12/08*    (2016.01)
*G06F 3/06*    (2006.01)

(52) U.S. Cl.
CPC ............ *G06F 12/0871* (2013.01); *G06F 3/064* (2013.01); *G06F 3/0608* (2013.01); *G06F3/0613* (2013.01); *G06F 3/0685* (2013.01); *G06F 12/0806* (2013.01); *G06F 12/0848* (2013.01); *G06F 2212/282* (2013.01); *G06F 2212/604* (2013.01); *G06F 2212/622* (2013.01)

(58) Field of Classification Search
CPC ............ G06F 12/0806; G06F 12/0848; G06F 12/0871; G06F 3/0608; G06F 3/0613; G06F 3/064; G06F 3/0685; G06F 2212/282; G06F 2212/604; G06F 2212/622; G06F 12/06; G06F 12/08; G06F 17/30
USPC .......................... 711/129, 111, 114, 154, 170
See application file for complete search history.

(56) References Cited

U.S. PATENT DOCUMENTS 5,649,151 A  *  7/1997  Chu ...................... G06F 3/0601
                                                           711/111
6,845,427 B1     1/2005  Atai-Azimi
(Continued)

FOREIGN PATENT DOCUMENTS

| CN | 1936864 A | 3/2007 |
|---|---|---|
| CN | 101169761 A | 4/2008 |
| CN | 101178693 A | 5/2008 |

OTHER PUBLICATIONS

Translation of Written Opinion and International Search Report from State Intellectual Property Office issued in corresponding International Application No. PCT/CN2013/080180, mailed on Oct. 31, 2013.

*Primary Examiner* — Pierre-Michel Bataille
(74) *Attorney, Agent, or Firm* — Frommer Lawrence & Haug LLP; William S. Frommer

(57) ABSTRACT

The present invention discloses a data storage space processing method and processing system, and a data storage server. The data storage space processing method includes: dividing a disk and memory resource into tablets; dividing memory space of a tablet into different logical objects; and dividing, according to a fixed size, disk space of the tablet into multiple data blocks that are of a same size. According to the data storage space processing system and method provided in embodiments of the present invention, a disk and memory resource on a storage server is divided into independent tablets, and the tablets are used as basic service resource allocating and managing units, which can implement multiplexing of a single-node resource on multiple services. Besides, by using hybrid indexing and associated write combining and block recycling technologies, random write IOPS of a system is improved, and index memory space can also be significantly saved.

6 Claims, 7 Drawing Sheets

(56) References Cited

U.S. PATENT DOCUMENTS

| | | | | |
|---|---|---|---|---|
| 7,885,932 B2 * | 2/2011 | Kulkarni | G06F 17/30312 | 711/161 |
| 2007/0124531 A1 * | 5/2007 | Nishihara | G06F 12/0246 | 711/3 |
| 2011/0283044 A1 | 11/2011 | Olds et al. | | |
| 2012/0124285 A1 * | 5/2012 | Soran | G06F 3/0608 | 711/114 |
| 2012/0278547 A1 * | 11/2012 | Zhang | G06F 12/023 | 711/104 |

* cited by examiner

DATA STORAGE SPACE PROCESSING METHOD AND PROCESSING SYSTEM, AND DATA STORAGE SERVER

This application claims the priority benefit of Chinese Patent Application No. 201210264003.7, filed Jul. 27, 2012, the content of which is incorporated by reference herein in its entirety for all purposes.

TECHNICAL FIELD

The present invention relates to the field of computer technology, and in particular, to a data storage space processing method and processing system, and a data storage server.

BACKGROUND

Currently, storage media of a processing system of distributed data storage space may be a serial advanced technology attachment (SATA) disk, a serial attached SCSI (SAS) disk, and a solid state disk (SSD) disk/card. With the development of hardware manufacturing technologies, a storage capacity of a single disk is constantly improved. However, a random IO (input output) capability of the disk is not be improve in proportion. The random IO capability of the storage media is a potential performance bottleneck. An idea for addressing the random IO performance bottleneck of the storage media is mainly to change the random IO to sequential IO or use a cache to reduce the number of times of IO. Random read is inevitable in most service storage access scenarios. Therefore, a memory Cache is generally used to reduce access to the storage media or change the storage media. For example, an SSD disk/card with high random read performance is alternatively used for optimization. For optimization of random write IO, random write may be changed to sequential write (such as SSTable of BigTable), or mmap maps data to memory for performing asynchronous IO.

Other existing manners for improving random IO are as follows: Google BigTable implements IO performance optimization by changing random write to sequential write, updates and stores all data within a period of time together and sequentially writes the data onto a disk by using MemTable and SSTable, divides a record according to a predefined sequence, and then combines data obtained after dividing with data of an earlier version; TyotoCabinet maps data on a disk to shared memory by using mmap, and reduces read and write on the disk by using the memory; an InnoDB storage engine of MySQL uses a B+ tree organization manner at a bottom layer, and also uses a Buffer Pool (buffer pool) to change write to asynchronous write, so as to improve write delay experience and reduce read and write on a disk.

The existing manners for improving random IO have the following disadvantages: Implementation of a system for changing random write to sequential write is complex, and an operation cost is high; in the manner for changing random write to sequential write by using the MemTable/SSTable, multiple pieces of data may need to be read during data reading, so as to obtain a latest data version. In addition, data read and write need to be executed on a large scale when data combination is performed, and operations such as splitting may also be performed, so that a system is complex, and an operation and maintenance cost is high. For the mmap and the buffer pool solution of MySQL, if a storage capacity of a single machine is higher than the memory and there is no obvious data hotspot, overall IO performance of the system lies in an actual capability of storage media, and efficiency for the memory to improve IO performance is limited.

SUMMARY

The present invention provides a data storage space processing method and processing system and a data storage server, so as to solve a problem in a data storage manner in the prior art that a random input output capability is limited, implementation is complex, and operation is difficult.

According to one aspect of the present invention, an embodiment of the present invention provides a data storage space processing method, including: dividing a disk and memory resource into tablets; dividing memory space of a tablet into different logical objects; and dividing, according to a fixed size, disk space of the tablet into multiple data blocks that are of a same size.

According to another aspect of the present invention, an embodiment of the present invention further provides a data storage space processing system, including a disk, memory, a resource dividing module, a logical object dividing module, and a data block dividing module, where the resource dividing module divides a disk and memory resource into tablets, the logical object dividing module divides memory space of a tablet into different logical objects, and the data block dividing module divides, according to a fixed size, disk space of the tablet into multiple data blocks that are of a same size.

According to still another aspect of the present invention, an embodiment of the present invention further provides a data storage server, including a disk and memory, where a disk and memory resource is divided into tablets; memory space of a tablet is divided into different logical objects; and disk space is divided, according to a fixed size, into multiple data blocks that are of a same size.

According to yet another aspect of the present invention, an embodiment of the present invention further provides a storage medium including a computer executable instruction, where the computer executable instruction is used to execute a data storage space processing method, and the method includes the following steps: dividing a disk and memory resource into tablets; dividing memory space of a tablet into different logical objects; and dividing, according to a fixed size, disk space of the tablet into multiple data blocks that are of a same size.

In addition, an embodiment of the present invention further provides a data read and write method. The read and write method includes record reading, record modifying, block write combining, and block recycling. The record reading includes: reading a write cache, searching for a record from the write cache according to a keyword, and performing direct returning if the record is found; obtaining a record index from a record index cache, and obtaining a record offset address and a record size according to the record index; and reading data from a disk according to the offset address and the record size in the index.

Technical solutions of embodiments of the present invention have the following advantages or beneficial effects: In the embodiments of the present invention, a disk and memory resource on a storage server is divided into independent tablets, and the tablets are used as basic service resource allocating and managing units, which can implement multiplexing of a single-node resource on multiple services. In addition, by using hybrid indexing and associated write combining and block recycling technologies, random write Input/

Output Operations Per Second (IOPS) of a system is improved, and index memory space can also be significantly saved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATED EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The following further describes the embodiments of the present invention in detail with reference to the accompanying drawings.

Figure 1:
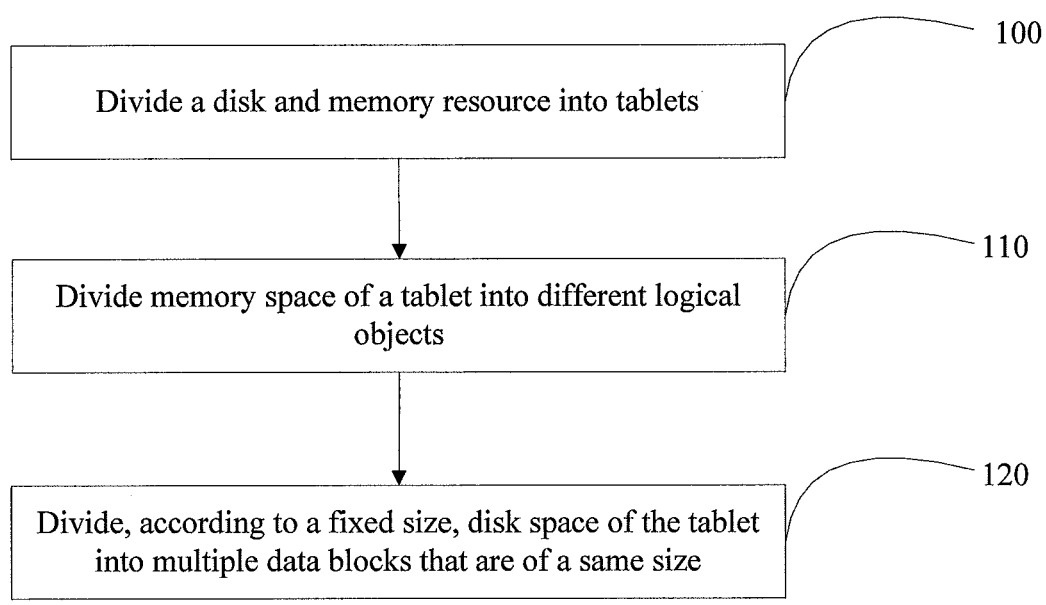
FIG. 1 is a flowchart of a data storage space processing method according to an embodiment of the present invention.

Reference may be made to FIG. 1. FIG. 1 is a flowchart of a data storage space processing method according to an embodiment of the present invention. The data storage space processing method in the embodiment of the present invention includes the following steps:

Step 100: Dividing a disk and memory resource into tablets (Tablet).

In step 100, each tablet works independently, and the tablet performs indexing on a record on a disk in a manner of combining hash and record indexing. In the embodiment, it is assumed that a resource of one tablet is formed by 2 GB space that is on a disk and with a continuous physical address and 16 MB shared memory space in memory. In addition, sizes of disk space and memory space may be set according to a requirement.

Step 110: Dividing memory space of a tablet into different logical objects.

Figure 2:
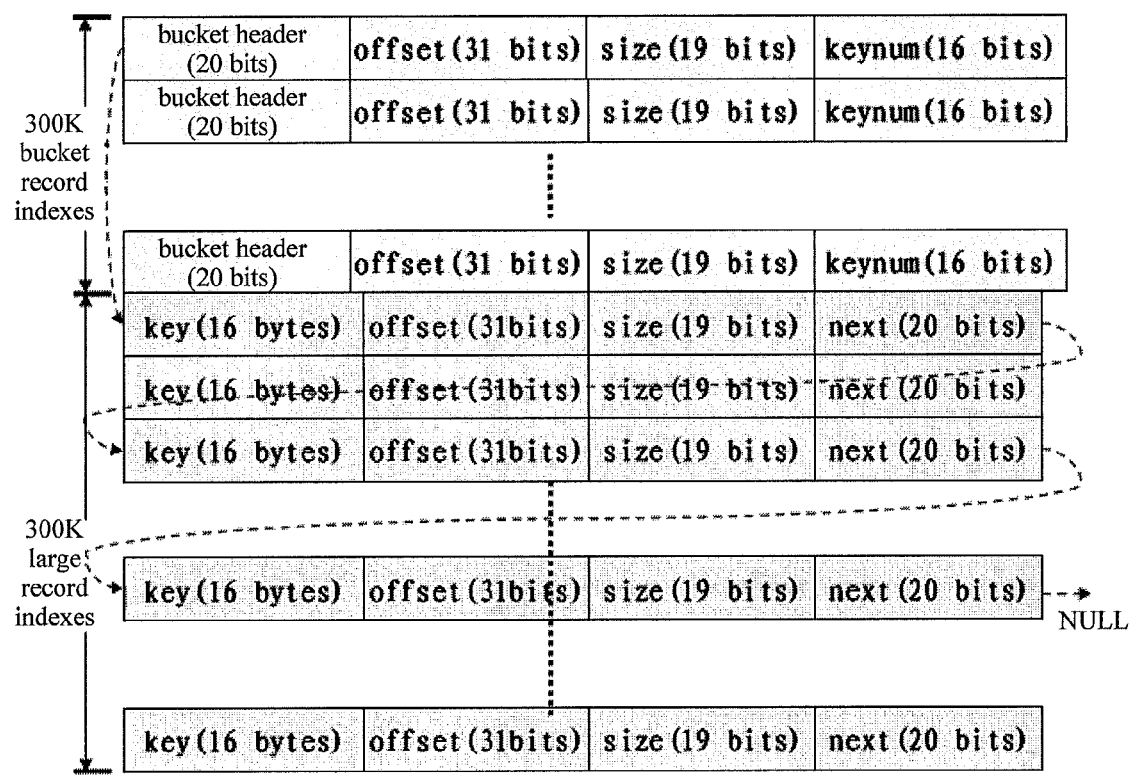
FIG. 2 is a schematic structural diagram of a memory of a record index cache of a data storage space processing method according to an embodiment of the present invention.

In step 110, the memory space of the tablet is divided into three logical objects: a record index cache KeyCache, a write cache WriteCache, and a block cache BlockCache, wherein the KeyCache occupies 12 MB space, including two parts: a bucket index and a large record index. For details, referring to FIG. 2, it is a schematic structural diagram of memory of a record index cache of a data storage space processing method according to an embodiment of the present invention. The KeyCache is used to store index information of a record. Records are divided into two types: a bucket record and a large record. In another embodiment, the KeyCache may merely include a large record index part, and the records may also be of merely one type: a large record. An index search of a record requires computing a value of hash(key)% (300*1024), so as to obtain one bucket record index. One large record index is located according to a bucket header field of the bucket record index. A next field of the large record index is used to traverse an entire chain, and an index of the record is found by comparing with a key. If the large record index is not hit, the bucket record index is taken as an index of the record. An organization of the KeyCache is in a hybrid index mode of the large record index and the bucket index. On the one hand, a disadvantage of a full index mode is addressed. According to a full index, one index needs to be established for each record in memory, so that index storage space is large, and a requirement for the memory is high. On the other hand, a disadvantage of a full bucket index is addressed. A bucket record is of a hash structure. According to the full bucket index, when one sub-record in a bucket is updated, an entire bucket record is read and written, where read and write bandwidth of a disk is enlarged. For an SSD storage medium, enlargement of write bandwidth decreases a service life, and affects read and write performance. According to the data storage space processing method in the embodiment, a record size threshold is set according to a memory condition. A large record index is used for a record larger than the threshold, one record has one independent index in the large record index, and the indexes are connected in series in a chain. A bucket record is used for a record smaller than the threshold, and a Hash bucket is packetized into a record and stored. On a disk, one index is established for one Hash bucket in memory, thereby significantly reducing the number of indexes. In the embodiment, a tablet may be designed to be 2 GB, the number of bucket records and large record indexes each is about 300,000, a large record index is used for a record larger than 4 KB, and a bucket index is used for a record smaller than 4 KB. If all records are of a large size, the number of records stored in a 2 G tablet is small, and 300,000 indexes are sufficient for storage. If all records are of a small size, 300,000 bucket indexes may ensure that a size of each bucket record does not exceed 4 KB.

The WriteCache occupies about 4 MB space, is used as a record write buffer, and implements asynchronous data write onto a disk. The WriteCache is based on a hash map (HashMap) of shared memory.

Figure 3:
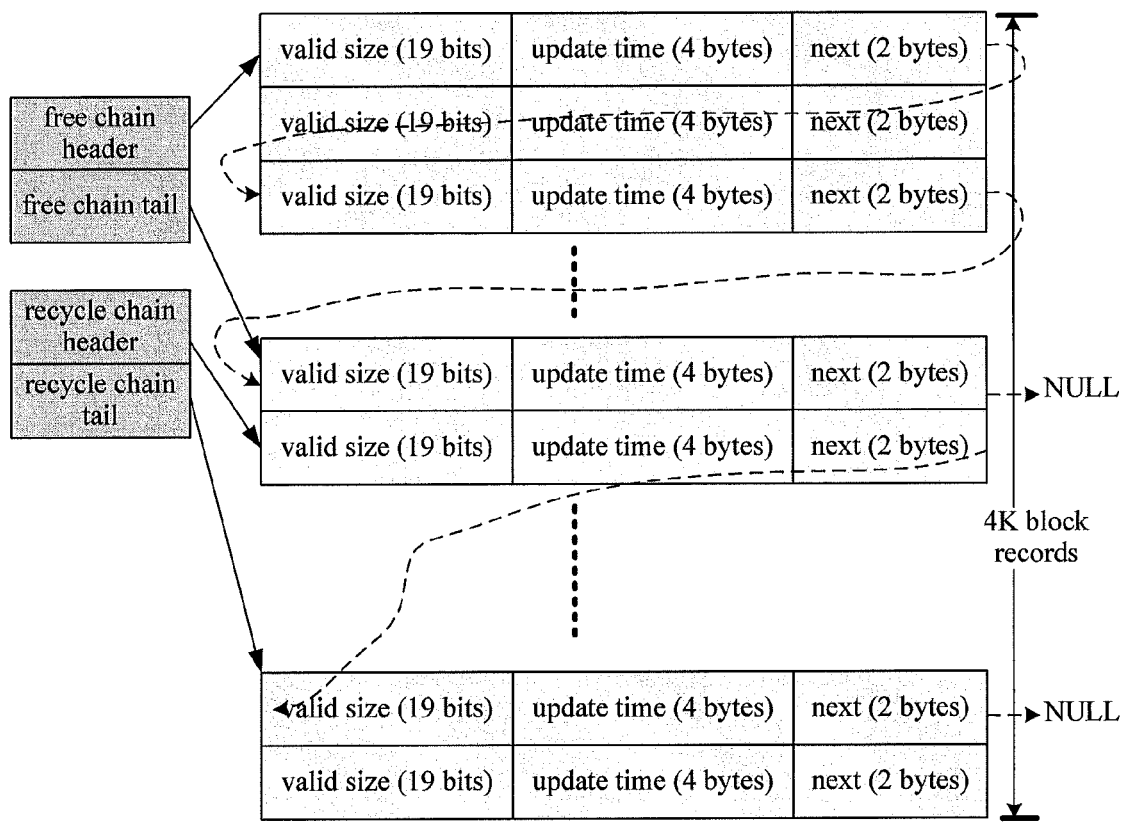
FIG. 3 is a schematic structural diagram of memory of a block cache of a data storage space processing method according to an embodiment of the present invention.

The BlockCache occupies 64 KB, is formed by 4000 16-byte block structure descriptors, and is used to collect statistics on status information of a data block. For details, referring to FIG. 3, it is a schematic structural diagram of memory of a block cache of a data storage space processing method according to an embodiment of the present invention. A valid size field indicates a total size of a record that is among records in a data block and not updated. An update time field indicates time when a block is written onto a disk. A next field is used to organize a free block and a to-be-recycled data block by using a linked list, so as to form, by linking, a free block chain (free chain) and a recycled block chain (recycle chain).

Step 120: Divide, according to a fixed size, disk space of the tablet into multiple data blocks that are of a same size.

In step 120, the 2 GB disk space of the tablet is divided, according to a fixed size, multiple data blocks that are of a same size. In an implementation manner of the present invention, assuming that a size of each data block is 512 KB, a data organization structure of each data block is as follows:

| <checksum, keylen, key, vallen, value> | <timestamp, checksum, recordnum> |
|---|---|
| Sequence | Trailer information block (a fixed length of 24 bytes) |

Each 5-tuple <checksum, keylen, key, vallen, value> describes one record stored in the data block. Records are arranged closely in the data block. At an end of the block, a fixed-length information block (Trailer information block) is used to describe meta-information of the block, for example, block data check, block write time, and the number of records in the block.

Figure 4:
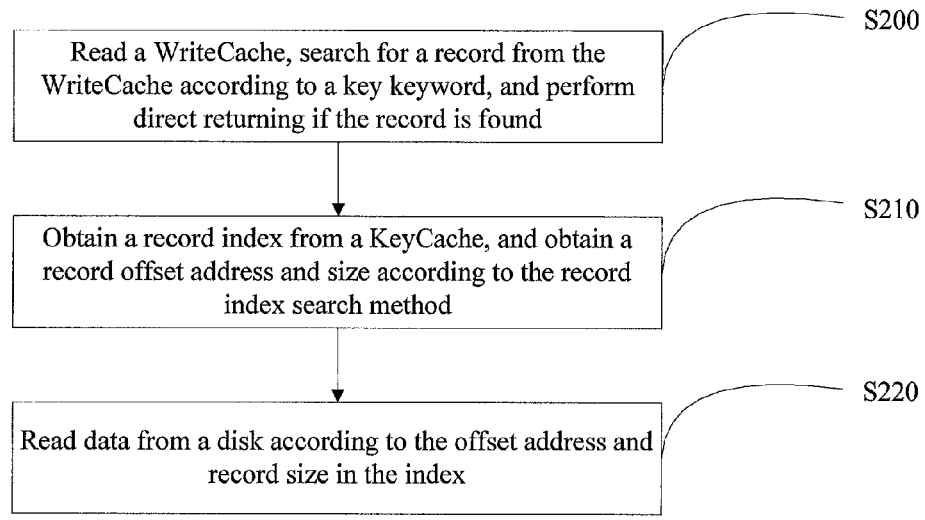
FIG. 4 is a flowchart of record reading of a data storage space processing method according to an embodiment of the present invention.

In the implementation manner of the present invention, a typical data read and write process according to the data storage space processing method includes record reading (read), record modifying (which includes Insert/Update/Delete), block write combining, and block recycling. For details, reference may be made to FIG. 4. FIG. 4 is a flowchart of record reading of a data storage space processing method according to an embodiment of the present invention. The record reading according to the data storage space processing method of the present invention includes the following steps:

Step 200: Read a WriteCache, and search for a record from the WriteCache according to a keyword. If the record is found, perform direct returning. The "returning" in step 200 indicates returning the record.

Step 210: Obtain a record index from a KeyCache, and obtain a record offset address (offset) and size according to the record index search method.

Step 220: Read data from a disk according to the offset address and record size in the index.

In step 220, corresponding processing is performed according to a record type: If the record is a large record, direct returning is performed (that is, the large record is returned). If the record is a bucket record, the bucket record is parsed, all sub-records in the bucket record are traversed, key matching is performed, a key is found, and a record is returned; and if the record is not found, an error message indicating that the record does not exist is returned.

Figure 5:
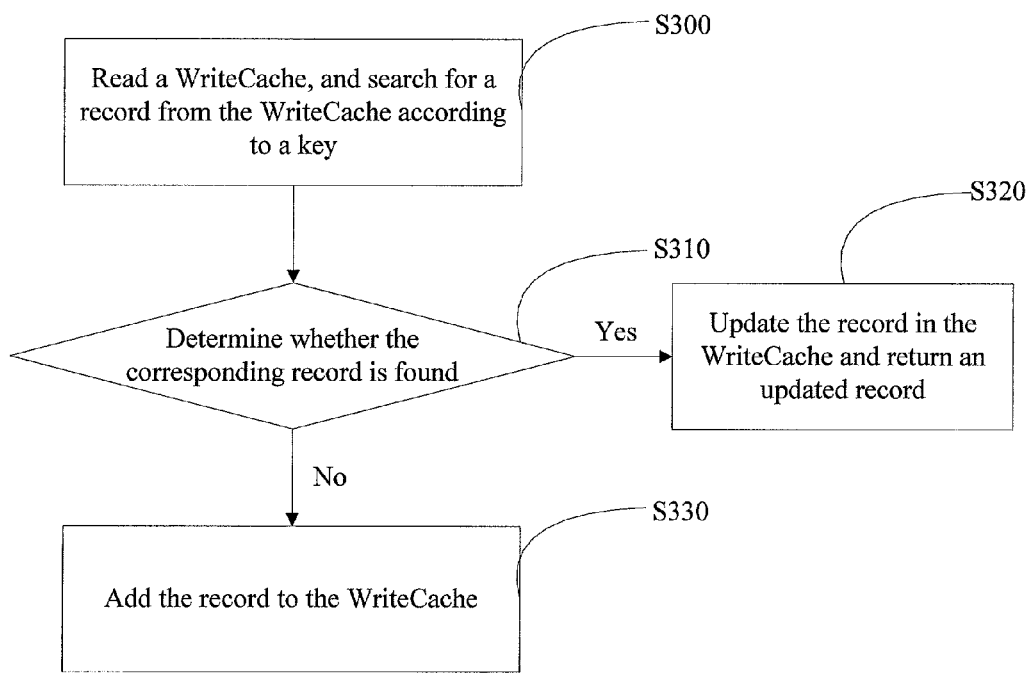
FIG. 5 is a flowchart of record modifying of a data storage space processing method according to an embodiment of the present invention.

Reference may be made to FIG. 5. FIG. 5 is a flowchart of record modifying of a data storage space processing method according to an embodiment of the present invention. The record modifying according to the data storage space processing method of the present invention includes the following steps:

Step 300: Read a WriteCache, and search for a record from the WriteCache according to a key.

Step 310: Determine whether the corresponding record is found. If the record is found, go to step 320; and if the record is not found, go to step 330.

Step 320: Update the record in the WriteCache and perform returning. The "returning" in step 320 indicates returning an updated record.

Step 330: Add the record to the WriteCache.

In step 330, a deleted record may be distinguished by setting a record flag.

Figure 6:
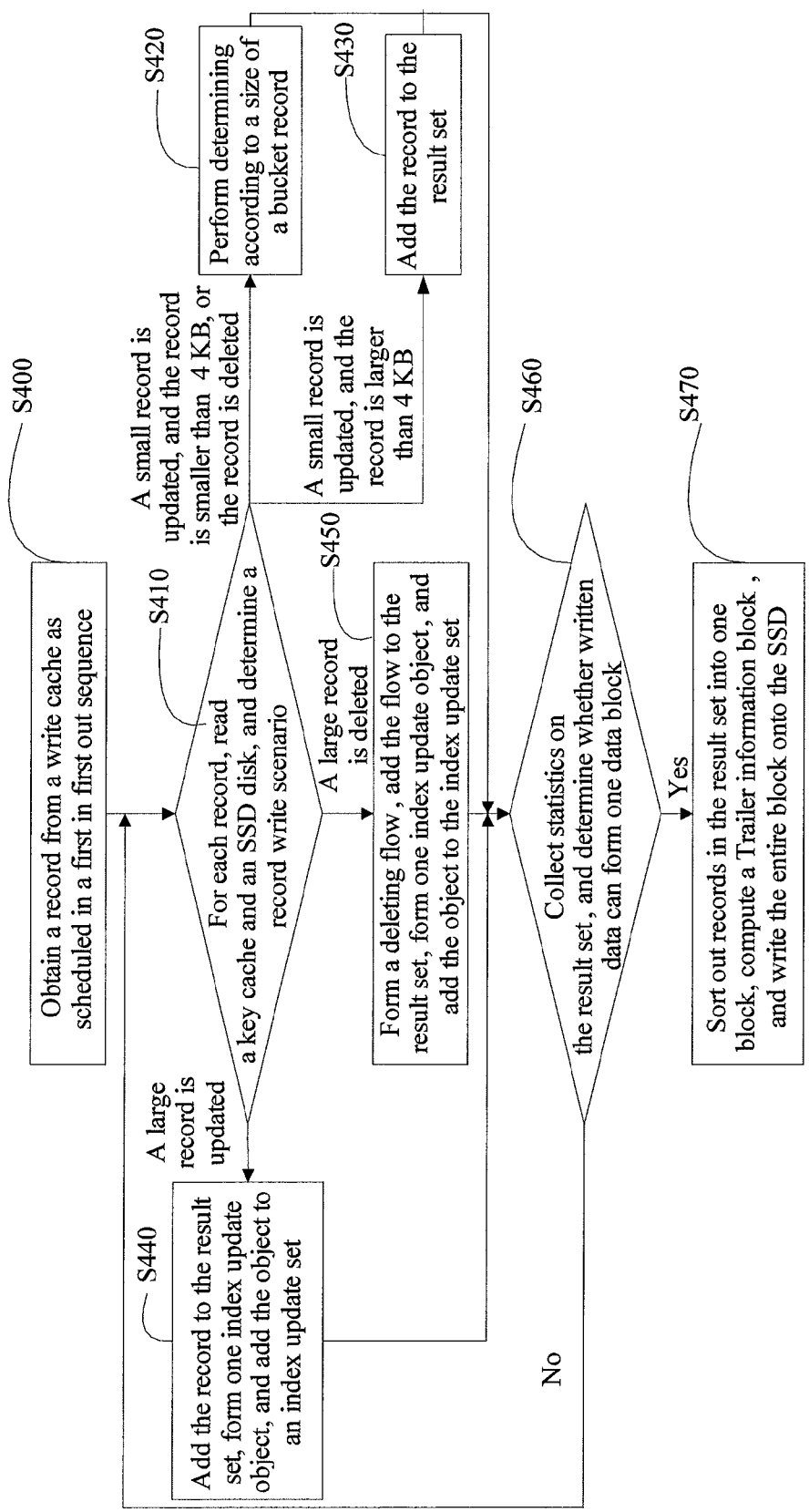
FIG. 6 is a flowchart of block write combining of a data storage space processing method according to an embodiment of the present invention.

Reference may be made to FIG. 6. FIG. 6 is a flowchart of block write combining of a data storage space processing method according to an embodiment of the present invention. The block write combining according to the data storage space processing method of the present invention includes the following steps:

Step 400: Obtain a record from a WriteCache as scheduled in a first in first out (FIFO) sequence.

In step 400, 512 KB data is read in one record obtaining process.

Step 410: For each record, read a KeyCache and an SSD disk, and determine a record write scenario.

If a small record is updated, and an updated record is still smaller than 4 KB, go to step 420;

if a small record is updated, and an updated record is larger than 4 KB, go to step 430;

if a large record is updated, go to step 440;

if a small record is deleted, go to step 420; and if a large record is deleted, go to step 450.

Step 420: Perform determining according to a size of a bucket record as follows:

size=0: Change the record to a bucket record, add the bucket record to a result set, and go to step 460; and size >0: Read a record from the SSD disk according to <offset, size> of a bucket record, perform reverse serialization, search for and update the record, re-serialize the bucket record, add a bucket record obtained after re-serialization to the result set, form one index update object, add the object to an index update set, and go to step 460.

Step 430: Add the record to the result set.

Delete the record from the bucket record, re-serialize the bucket record, add a bucket record obtained after re-serialization to the result set, form two index update objects, add the objects to the index update set, and go to step 460.

Step 440: Add the record to the result set, form one index update object, add the object to the index update set, and go to step 460.

Step 450: Form a deleting flow, add the flow to the result set, form one index update object, add the object to the index update set, and go to step 460.

Step 460: Collect statistics on the result set, and determine whether written data can form one data block (512 KB). If the written data can form one data block, go to step 470; and if the written data cannot form one data block, go to step 410 to continue processing a remaining record.

Step 470: Sort out records in the result set into one data block, compute a Trailer information block, and write the entire data block onto the SSD. Submit an index update set obtained after block combining, so as to update the KeyCache in batches. Submit an instruction for cleaning up the Write-Cache, so as to remove a written record from the WriteCache.

In step 470, the result set and the index update set are cleaned up. Return to step 410 to continue processing a remaining record.

Figure 7:
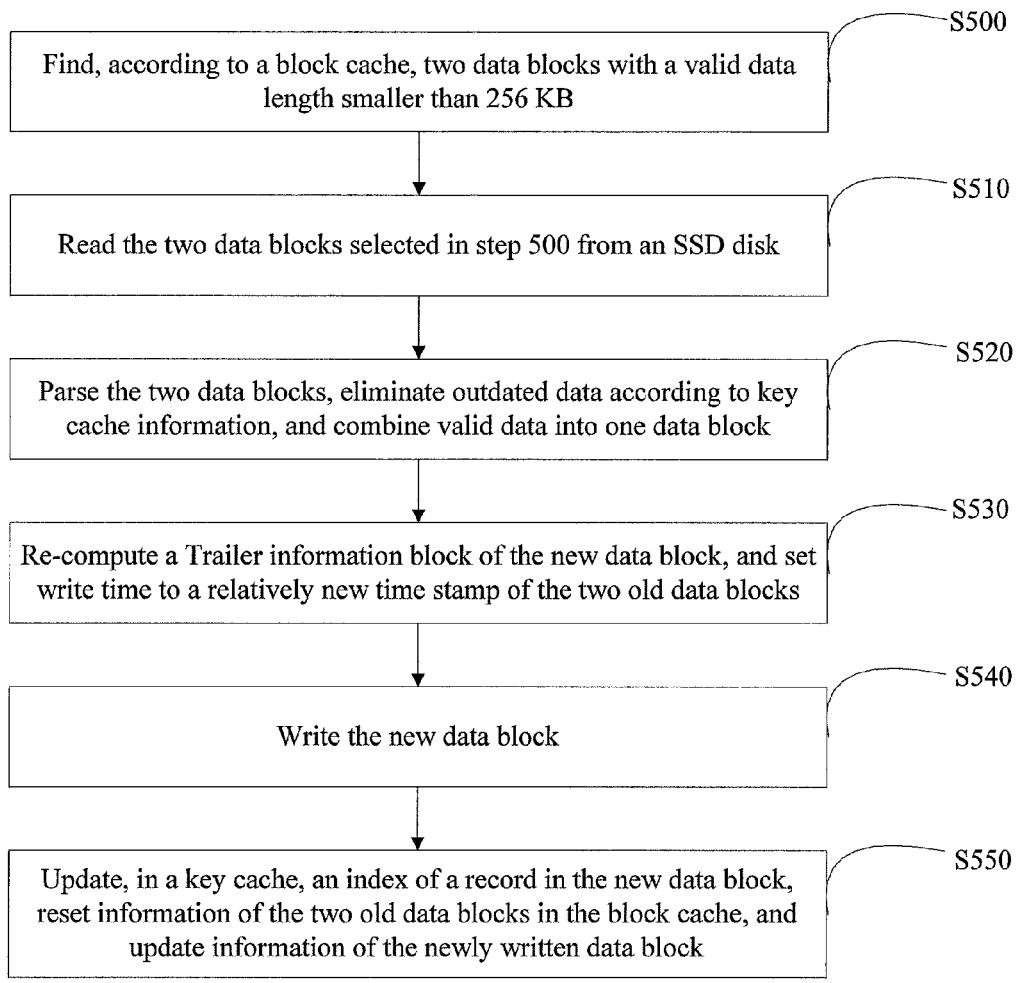
FIG. 7 is a flowchart of block recycling of a data storage space processing method according to an embodiment of the present invention.

Reference may be made to FIG. 7. FIG. 7 is a flowchart of block recycling of a data storage space processing method according to an embodiment of the present invention. The block recycling according to the data storage space processing method of the present invention includes the following steps:

Step 500: Find, according to a BlockCache, two data blocks with a valid data length smaller than 256 KB.

Step 510: Read the two data blocks selected in step 500 from an SSD disk.

Step 520: Parse the selected two data blocks, eliminate outdated data according to KeyCache information, and combine valid data into one data block, where the valid data is data that remains after the outdated data is eliminated.

Step 530: Re-compute a Trailer information block of the new data block, and set write time to a relatively new time stamp of the two old data blocks, where the "new data block" refers to the data block generated by combining the valid data in step 520, and the "two old data blocks" refer to the two data blocks selected in step 510.

Step 540: Write the new data block.

Step 550: Update, in a KeyCache, an index recorded in the new data block, reset information of the two old data blocks in the BlockCache, and update information of the newly written data block.

Figure 8:
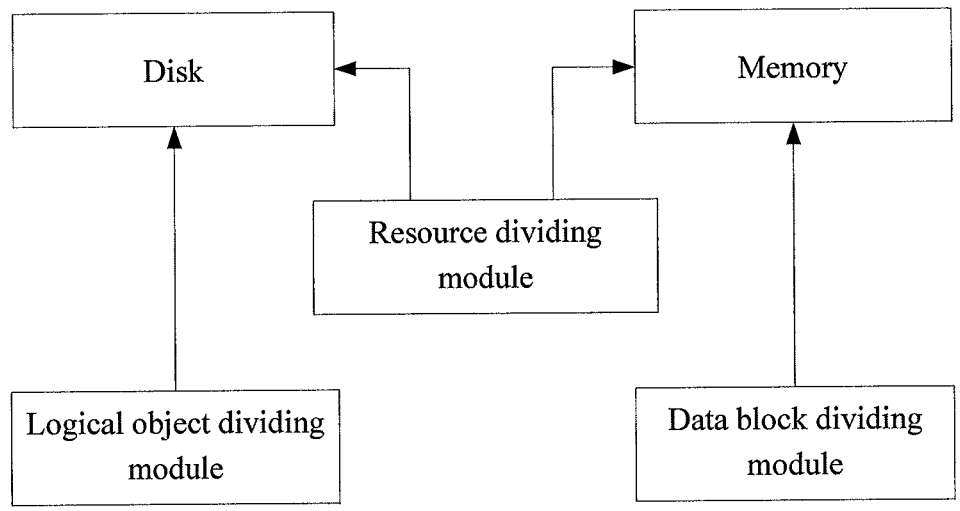
FIG. 8 is a schematic structural diagram of a data storage space processing system according to an embodiment of the present invention.

Reference may be made to FIG. 8. FIG. 8 is a schematic structural diagram of a data storage space processing system according to an embodiment of the present invention. The data storage space processing system in the embodiment of the present invention includes a disk, memory, a resource dividing module, a logical object dividing module, and a data block dividing module.

The resource dividing module divides a disk and memory resource into tablets (Tablet), where each tablet works independently, and the tablet performs indexing on a record on a disk in a manner of combining hash and record indexing. In an implementation manner of the present invention, it is assumed that a resource of one tablet is formed by 2 GB space that is on a disk and with a continuous physical address and 16 MB shared memory space in memory.

The logical object dividing module divides the memory space of the tablet into different logical objects. The memory space of the tablet is divided into three logical objects: a record index cache KeyCache, a write cache WriteCache, and a block cache BlockCache, where the KeyCache occupies 12 MB space, including two parts: a bucket index and a large record index. The KeyCache is used to store index information of a record. Records are correspondingly divided into two types: a bucket record and a large record. In another implementation manner of the present invention, the KeyCache may merely include a large record index part, and the records may also be of merely one type: a large record. An index search of a record requires computing a value of hash(key)%(300*1024), so as to obtain one bucket record index. One large record index is located according to a bucket header field of the bucket record index. A next field of the large record index is used to traverse an entire chain, and an index of the record is found by comparing with a key. If the large record index is not hit, the bucket record index is taken as an index of the record. The WriteCache occupies about 4 MB space, is used as a record write buffer, and implements asynchronous data write onto a disk. The BlockCache occupies 64 KB, is formed by 4000 16-byte block structure descriptors, and is used to collect statistics on block status information. A valid size field of a block indicates a total size of a record that is among records in the block and not updated. An update time field of a block indicates time when the block is written onto a disk. A next field of a block is used to organize a free block and a to-be-recycled block by using a linked list, so as to form, by linking, a free block chain (free chain) and a recycled block chain (recycle chain). The WriteCache is based on a hash map (HashMap) of shared memory.

The data block dividing module divides, according to a fixed size, the disk space of the tablet into multiple data blocks that are of a same size. In an implementation manner of the present invention, assuming that a block size is 512 KB, a data organization structure of each data block is as follows:

| <checksum, keylen, key,vallen, value> <timestamp, checksum, recordnum> | |
|---|---|
| Sequence | Trailer information block (a fixed length of 24 bytes) |

Each 5-tuple <checksum, keylen, key, vallen, value> describes one record stored in the data block. Records are arranged closely in the data block. At an end of the block, a fixed-length information block (Trailer information block) is used to describe meta-information of the block, for example, block data check, block write time, and the number of records in the block.

Figure 9:
FIG. 9 is a schematic structural diagram of a data storage server according to an embodiment of the present invention.

Reference may be made to FIG. 9. FIG. 9 is a schematic structural diagram of a data storage server according to an embodiment of the present invention. The data storage server in the embodiment of the present invention includes a disk and memory.

A disk and memory resource is divided into tablets (Tablet), where each tablet works independently, and the tablet performs indexing on a record on a disk in a manner of combining hash and record indexing. In an implementation manner of the present invention, it is assumed that a resource of one tablet is formed by 2 GB space that is on a disk and with a continuous physical address and 16 MB shared memory space in memory.

The memory space of the tablet is divided into different logical objects. The memory space of the tablet is divided into three logical objects: a record index cache KeyCache, a write cache WriteCache, and a block cache BlockCache, where the KeyCache occupies 12 MB space, including two parts: a bucket index and a large record index. The KeyCache is used to store index information of a record. Records are correspondingly divided into two types: a bucket record and a large record. In another implementation manner of the present invention, the KeyCache may merely include a large record index part, and the records may also be of merely one type: a large record. An index search of a record requires computing a value of hash(key)%(300*1024), so as to obtain one bucket record index. One large record index is located according to a bucket header field of the bucket record index. A next field of the large record index is used to traverse an entire chain, and an index of the record is found by comparing with a key. If the large record index is not hit, the bucket record index is taken as an index of the record. The WriteCache occupies about 4 MB space, is used as a record write buffer, and implements asynchronous data write onto a disk. The BlockCache occupies 64 KB, is formed by 4000 16-byte block structure descriptors, and is used to collect statistics on block status information. A valid size field of a block indicates a total size of a record that is among records in the block and not updated. An update time field of a block indicates time when the block is written onto a disk. A next field of a block is used to organize a free block and a to-be-recycled block by using a linked list, so as to form, by linking, a free block chain (free chain) and a recycled block chain (recycle chain). The WriteCache is based on a hash map (HashMap) of shared memory.

The disk space of the tablet is divided, according to a fixed size, into multiple data blocks that are of a same size. In an implementation manner of the present invention, assuming that a size of each data block is 512 KB, a data organization structure of each data block is as follows:

| <checksum, keylen, key, vallen, value> | <timestamp, checksum, recordnum> |
|---|---|
| Sequence | Trailer information block (a fixed length of 24 bytes) |

Each 5-tuple <checksum, keylen, key, vallen, value> describes one record stored in the data block. Records are arranged closely in the data block. At an end of the block, a fixed-length information block (Trailer information block) is used to describe meta-information of the block, for example, block data check, block write time, and the number of records in the block.

In the embodiments of the present invention, a disk and memory resource on a storage server is divided into independent tablets, and the tablets are used as basic service resource allocating and managing units, which can implement multiplexing of a single-node resource on multiple services. In addition, in the embodiments of the present invention, random write of disk IO is reduced by using block write combining and block recycling. When a record is read, the record is obtained according to a record index in memory by using one time of disk IO.

A person of ordinary skill in the art may understand that all or a part of the steps of the methods in the embodiments may be implemented by a program instructing relevant hardware. The program may be stored in a computer readable storage medium. The storage medium may include a read-only memory, a magnetic disk, an optical disc, or the like.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A data storage space processing method, comprising:
dividing a disk and memory resource into tablets;
dividing memory space of each tablet into different logical objects; and
dividing, according to a fixed size, disk space of each tablet into multiple data blocks that are of a same size; wherein
the logical objects obtained by dividing the memory space of the tablet comprise: a record index cache, a write cache, and a block cache; the record index cache is used to store index information of a record; the write cache is used to record a write buffer; and the block cache is formed by a block structure descriptor and used to collect statistics on block status information;
the record index cache comprises a bucket index and a large record index; the large record index is used for a record larger than a set record size threshold, and in the large record index, an independent index is used for the record larger than the set record size threshold; and the bucket index is used for a record smaller than the set record size threshold, and a bucket is packetized into the record smaller than the set record size threshold and stored;
the data storage space processing method comprises record reading, record modifying, block write combining, and block recycling, and the block write combining comprises: obtaining a record from the write cache every preset time interval; for each record, reading a keyword cache and the disk, and determining a record write scenario; collecting statistics on a result set, and determining whether written data is able to form one data block; if the written data is able to form one data block, sorting out a record in the result set to form one data block; and if the written data is not able to form one data block, continuing processing a remaining record.

2. The data storage space processing method according to claim 1, wherein a data organization structure of the data blocks comprises a sequence and a fixed-length information block, the sequence is used to describe a record stored in the data blocks, and the fixed-length information block is used to describe meta-information of the data blocks.

3. The data storage space processing method according to claim 2, wherein the block write combining comprises: finding, according to the block cache, two data blocks with a valid data length smaller than a preset size; reading the found data blocks from the disk; parsing the data blocks, eliminating outdated data according to keyword cache information, and combining valid data into one data block; re-computing a fixed-length information block of the new data block, and setting write time to a relatively new time stamp of the two old data blocks; writing the new data block; updating, in the keyword cache, an index of a record in the new data block; and resetting information of the two old data blocks in the block cache, and updating information of the newly written data block.

4. The data storage space processing method according to claim 1, wherein the record reading comprises: reading the write cache, searching for a record from the write cache according to a keyword, and performing direct returning if the record is found; obtaining a record index from the record index cache, and obtaining a record offset address and a record size according to the record index; and reading data from the disk according to the offset address and the record size in the index.

5. The data storage space processing method according to claim 4, wherein the record modifying comprises: reading the write cache, and searching for a record from the write cache according to a keyword; determining whether the corresponding record is found; if the record is found, updating the record in the write cache and returning an updated record; and if the record is not found, adding the record to the write cache.

6. The data storage space processing method according to claim 1, wherein in the block write combining of the data storage space processing method, the determining a record write scenario comprises: if a small record is updated or deleted and the updated record is smaller than a preset value, changing the record to a bucket record according to a size of the bucket record, and adding the bucket record to the result set, or re-serializing the bucket record, and adding the bucket record obtained after re-serialization to the result set; if the small record is updated and the updated record is larger than a preset value, deleting the record from the bucket record, re-serializing the bucket record, adding the bucket record obtained after re-serialization to the result set, forming two index update objects, and adding the two index update objects to an index update set; if a large record is updated, adding the large record to the result set, forming one index update object, and adding the index update object to the index update set; if the large record is deleted, forming a deleting flow, adding the deleting flow to the result set, forming one index update object, and adding the index update object to the index update set.

* * * * *